(12) United States Patent
Murashige et al.

(10) Patent No.: US 11,220,088 B2
(45) Date of Patent: Jan. 11, 2022

(54) LONG THIN GLASS BODY

(71) Applicant: NITTO DENKO CORPORATION, Ibaraki (JP)

(72) Inventors: Takeshi Murashige, Ibaraki (JP); Junichi Inagaki, Ibaraki (JP); Seong Jin Ryu, Ibaraki (JP); Hiroyuki Takemoto, Ibaraki (JP)

(73) Assignee: NITTO DENKO CORPORATION, Osaka (JP)

( * ) Notice: Subject to any disclaimer, the term of this patent is extended or adjusted under 35 U.S.C. 154(b) by 985 days.

(21) Appl. No.: 14/777,096

(22) PCT Filed: Mar. 19, 2014

(86) PCT No.: PCT/JP2014/057457
§ 371 (c)(1),
(2) Date: Sep. 15, 2015

(87) PCT Pub. No.: WO2014/148525
PCT Pub. Date: Sep. 25, 2014

(65) Prior Publication Data
US 2016/0039183 A1    Feb. 11, 2016

(30) Foreign Application Priority Data

Mar. 21, 2013 (JP) .............................. JP2013-057974

(51) Int. Cl.
*B32B 3/24* (2006.01)
*B32B 7/06* (2019.01)
(Continued)

(52) U.S. Cl.
CPC ................ *B32B 7/06* (2013.01); *B32B 3/266* (2013.01); *B32B 7/12* (2013.01); *B32B 37/14* (2013.01);
(Continued)

(58) Field of Classification Search
CPC ............ B32B 3/266; Y10T 428/24314; Y10T 428/24331
(Continued)

(56) References Cited

U.S. PATENT DOCUMENTS 3,891,494 A * 6/1975 Hunter ................... B26D 3/003
156/437
5,744,213 A * 4/1998 Nelson ..................... B27M 1/04
312/213
(Continued)

FOREIGN PATENT DOCUMENTS

CN       101925456 A    12/2010
EP       0 716 339 A1   6/1996
(Continued)

OTHER PUBLICATIONS

Extended (supplementary) European Search Report dated Oct. 27, 2016, issued in counterpart European Application No. 14769775.9. (6 pages).
(Continued)

*Primary Examiner* — William P Watkins, III
(74) *Attorney, Agent, or Firm* — Westerman, Hattori, Daniels & Adrian, LLP (57) ABSTRACT

There is provided a thin glass elongated body having a small amount of air bubbles between a thin glass and a resin film. A thin glass elongated body of the present invention includes: a thin glass having an elongated shape; and a resin film bonded onto at least part of the thin glass, wherein the resin film has, in a portion in which the thin glass and the resin film are laminated, a plurality of cutting lines and/or holes each penetrating through the resin film.

7 Claims, 4 Drawing Sheets

(51) Int. Cl.
  *B32B 7/12* (2006.01)
  *B32B 3/26* (2006.01)
  *B32B 37/14* (2006.01)
  *B32B 38/00* (2006.01)

(52) U.S. Cl.
  CPC ...... *B32B 38/0004* (2013.01); *B32B 2457/20* (2013.01); *Y10T 428/24314* (2015.01); *Y10T 428/24331* (2015.01)

(58) Field of Classification Search
  USPC .............................. 157/87; 428/136; 156/87
  See application file for complete search history.

(56) References Cited

U.S. PATENT DOCUMENTS

| | | | |
|---|---|---|---|
| 6,858,283 B2 * | 2/2005 | Nishizawa | B29C 49/24 156/87 |
| 8,304,058 B2 | 11/2012 | Nakamura et al. | |
| 8,425,711 B2 | 4/2013 | Higuchi et al. | |
| 8,609,229 B2 | 12/2013 | Kondo | |
| 2005/0181164 A1 | 8/2005 | Piumarta et al. | |
| 2008/0173389 A1 | 7/2008 | Mehta et al. | |
| 2009/0321005 A1 | 12/2009 | Higuchi et al. | |
| 2010/0260964 A1 | 10/2010 | Nakamura et al. | |
| 2010/0276066 A1 | 11/2010 | Kondo | |
| 2012/0135187 A1 | 5/2012 | Takimoto et al. | |
| 2012/0171454 A1 | 7/2012 | Kondo | |
| 2013/0133809 A1 | 5/2013 | Kondo | |
| 2014/0120309 A1 | 5/2014 | Ishii | |

FOREIGN PATENT DOCUMENTS

| | | |
|---|---|---|
| JP | 1-500990 A | 4/1989 |
| JP | 8-283041 A | 10/1996 |
| JP | 2001-97733 A | 4/2001 |
| JP | 2010-228166 A | 10/2010 |
| JP | 2011-42773 A | 3/2011 |
| JP | 2012-30404 A | 2/2012 |
| JP | 2012-126855 A | 7/2012 |
| JP | 2013-14012 A | 1/2013 |
| WO | 87/06626 A1 | 11/1987 |
| WO | 2008/111361 A1 | 9/2008 |
| WO | 2009/093505 A1 | 7/2009 |
| WO | 2011/030716 A1 | 3/2011 |

OTHER PUBLICATIONS

Office Action dated Jun. 14, 2016, issued in counterpart Chinese Patent Application No. 201480017076.3, with English translation. (20 pages).
International Search Report dated May 27, 2014, issued in counterpart application No. PCT/JP2014/057457 (2 pages).

* cited by examiner

LONG THIN GLASS BODY

TECHNICAL FIELD

The present invention relates to a thin glass elongated body.

BACKGROUND ART

In recent years, light-weighting and thinning of a display device, an illumination device, and a solar battery have been progressed from the viewpoints of transportation, storage, design, and the like. Further, continuous production has also been carried out to manufacture a film-shaped member to be used in those devices by a roll-to-roll process. For example, a thin glass is frequently used as a flexible material which may be subjected to processing or treatment by the roll-to-roll process (for example, Patent Literatures 1 and 2).

The thin glass involves problems in that the thin glass is liable to be broken in its processing or treatment owing to its extreme fragility, a device is fouled with glass pieces resulting from the breakage, excessive caution is required for restoration of the fouled device, and the like. In order to prevent the breakage of the thin glass, and to prevent the fouling of the device even when the thin glass is broken, a method of bonding a protective film onto a surface of the thin glass to protect the thin glass has been known (for example, Patent Literature 3). However, when a film, such as the protective film, is bonded onto the thin glass, there is a problem in that air is trapped between the thin glass and the film to generate air bubbles. In the case where the thin glass having the film is taken up with the air bubbles generated, the thin glass is liable to be broken due to the air bubbles. Further, in the case where the thin glass having the film with the air bubbles generated is subjected to a roll-to-roll process into which laminate roll, a nip roll, or the like is incorporated, the air bubbles accumulate at an inlet of the roll and increase in size while the thin glass having the film continuously passes through the roll, with the result that troubles are liable to occur during processing and conveyance. Further, in the thin glass having the film having a difference in surface level, air is liable to be trapped between the thin glass and the film during bonding, and thus the above-mentioned problem becomes more conspicuous. Various problems are caused in the thin glass having the film with the air bubbles generated, and hence, in the case where air is trapped between the thin glass and the film during bonding of the film, an attempt is generally made to perform peeling and rebonding (rework) of the film. However, the thin glass serving as an adherend is liable to be broken during peeling of the film, and it is also difficult to rework the film.

CITATION LIST

Patent Literature

[PTL 1] JP 01-500990 A
[PTL 2] JP 08-283041 A
[PTL 3] JP 2010-228166 A

SUMMARY OF INVENTION

Technical Problem

The present invention has been made to solve the above-mentioned problems inherent in the related art, and an object of the present invention is to provide a thin glass elongated body having a small amount of air bubbles between a thin glass and a resin film.

Solution to Problem

A thin glass elongated body of the present invention includes: a thin glass having an elongated shape; and a resin film bonded onto at least part of the thin glass, wherein the resin film has, in a portion in which the thin glass and the resin film are laminated, a plurality of cutting lines and/or holes each penetrating through the resin film.

In one embodiment of the present invention, the plurality of cutting lines are inclined with respect to a longitudinal direction of the thin glass elongated body.

In one embodiment of the present invention, the plurality of cutting lines or holes are projected onto one imaginary line parallel to a width direction of the resin film, a set of projection lines forms one continuous line or one discontinuous line having a disconnected portion of 5 mm or less.

In one embodiment of the present invention, a length of the continuous line or the discontinuous line is 60% or more with respect to a width of the resin film.

In one embodiment of the present invention, the thin glass has a thickness of from 10 μm to 150 μm.

In one embodiment of the present invention, the thin glass and the resin film are bonded onto each other through intermediation of a pressure-sensitive adhesive layer.

According to another aspect of the present invention, there is provided a thin glass rolled body. The thin glass rolled body is formed by taking up the thin glass elongated body.

According to another aspect of the present invention, there is provided a method of manufacturing the thin glass elongated body. The method of manufacturing the thin glass elongated body includes subjecting the thin glass and the resin film to preliminary bonding by laminating the resin film onto the thin glass; and subjecting, after the preliminary bonding, the thin glass and the resin film to final bonding through use of a pressure roll, the method further comprising, before the final bonding, forming a plurality of cutting lines and/or holes each penetrating through the resin film in the resin film.

Advantageous Effects of Invention

According to the embodiments of the present invention, the thin glass elongated body having a small amount of air bubbles between the thin glass and the resin film can be provided by causing the resin film to be bonded onto the thin glass to have a plurality of cutting lines and/or holes each penetrating through the resin film. The thin glass elongated body can be stably manufactured with less trouble such as the breakage of the thin glass because air trapped between the thin glass and the resin film can be released during manufacturing.

DESCRIPTION OF EMBODIMENTS

A. Thin Glass Elongated Body

Figure 1:
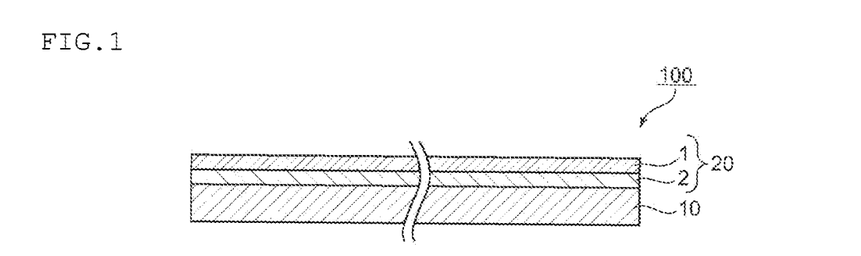
FIG. 1 is a schematic sectional view of a thin glass elongated body according to a preferred embodiment of the present invention.

FIG. 1 is a schematic sectional view of a thin glass elongated body according to a preferred embodiment of the present invention. In FIG. 1, the lateral direction of the drawing sheet corresponds to the longitudinal direction of the thin glass elongated body. A thin glass elongated body 100 includes a thin glass 10 and a resin film 20 bonded onto the thin glass 10. Although the resin film 20 is bonded over the whole length and width of the thin glass 10 in the illustrated example, the resin film 20 may be bonded onto part of the thin glass 10. Further, the resin film may be arranged on one surface of the thin glass or on both surfaces thereof (on one surface in the illustrated example). In this embodiment, the resin film 20 can serve as a protective film for the thin glass 10. It is preferred that the resin film 20 may include a base material layer 1 and a pressure-sensitive adhesive layer 2, and the thin glass 10 and the resin film 20 may be bonded onto each other through intermediation of the pressure-sensitive adhesive layer 2. It should be noted that, in FIG. 1, cutting lines to be formed in the resin film are omitted.

Figure 2:
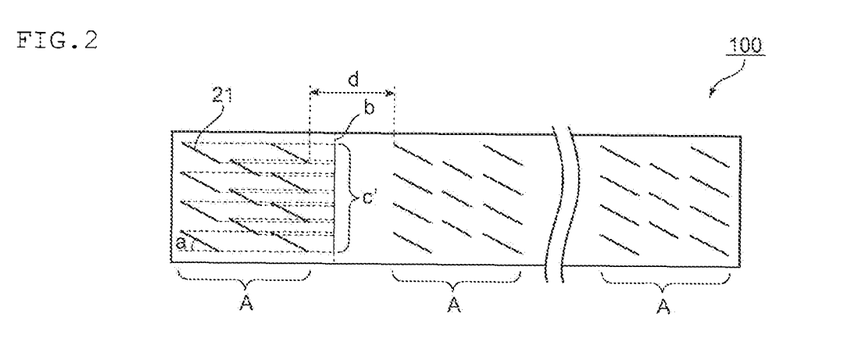
FIG. 2 is a schematic plan view of the thin glass elongated body of FIG. 1.

FIG. 2 is a schematic plan view of the thin glass elongated body 100 of FIG. 1 viewed from the resin film 20 side. In FIG. 2, the lateral direction of the drawing sheet corresponds to the longitudinal direction of the thin glass elongated body. The resin film 20 of the thin glass elongated body 100 includes a plurality of cutting lines 21. The cutting lines 21 each penetrate through the resin film 20. When the cutting lines each penetrating through the resin film are formed, air which is trapped when the resin film is bonded onto the thin glass is released, or air trapped between the thin glass and the resin film is released when a laminate obtained by bonding the resin film onto the thin glass is conveyed by a roll-to-roll process (more specifically, when the laminate is caused to pass through a pressure roll, such as a laminate roll or a nip roll). As a result, the thin glass elongated body having trapped a small amount of air (that is, air bubbles) can be obtained. Further, the breakage of the thin glass caused by the air bubbles, which occurs after the thin glass elongated body is taken up, can be prevented.

In one embodiment, the cutting lines 21 are inclined with respect to the longitudinal direction of the thin glass elongated body 100. When the cutting lines 21 are formed so as to be inclined, air trapped between the thin glass and the resin film is released during manufacturing by the roll-to-roll process, and the opening of the cutting lines can be prevented. When the opening of the cutting lines is prevented, a thin glass elongated body in which troubles during conveyance are suppressed and the resin film can effectively protect the thin glass can be obtained. An inclined angle a of each cutting line with respect to the longitudinal direction of the resin film is preferably from 10° to 80°, more preferably from 30° to 60°.

The length of each cutting line may be set to any appropriate length as long as the effect of the present invention is obtained. For example, in the case where the width of the resin film is from 300 mm to 1,000 mm, the length of each cutting line is preferably from 10 mm to 500 mm, more preferably from 20 mm to 150 mm, still more preferably from 30 mm to 60 mm. Further, in the case where the cutting lines are inclined, the length of each cutting line is preferably less than 50%, more preferably 40% or less, still more preferably from 3% to 35%, particularly preferably from 3% to 20% with respect to the width of the resin film. In the case where the length of each cutting line is 50% or more with respect to the width of the resin film, the stiffness of the resin film decreases, and there is a risk in that the resin film may not serve as the protective film. Further, during manufacturing of the thin glass elongated body or during conveyance in the roll-to-roll process to which the obtained thin glass elongated body is subjected, there is a risk in that troubles such as the breakage of the thin glass may occur.

It is preferred to form the plurality of cutting lines 21 in both the longitudinal direction and the width direction. The cutting lines may be formed at a uniform density (that is, over the entire resin film at a substantially constant interval) or may be formed at a non-uniform density in plan view. As illustrated in FIG. 2, the cutting lines 21 are preferably formed so as to be aggregated densely in a predetermined region to form a group A of cutting lines. For example, the three to twenty cutting lines 21 are aligned in one row or a plurality of rows (11 cutting lines in 3 rows in FIG. 2) in a region having a width of from 300 mm to 1,000 mm (resin film width) and a length of from 100 mm to 1,000 mm to form the group A of cutting lines. It is preferred that a plurality of groups of cutting lines be formed in the longitudinal direction of the resin film 20, and it is more preferred that the groups of cutting lines be formed at least in both end portions of the resin film in the longitudinal direction. The groups of cutting lines may be formed at a predetermined interval d, for example, at an interval of from 1 m to 50 m, more preferably from 2 m to 30 m in the longitudinal direction. The intervals of the groups of cutting lines may or may not be constant. When the cutting lines are formed so as to form the groups of cutting lines, the thin glass elongated body in which trapped air is released in a larger amount and the amount of the air bubbles is small, while the strength of the resin film 20 is maintained, can be obtained.

Figures 3A, 3B:
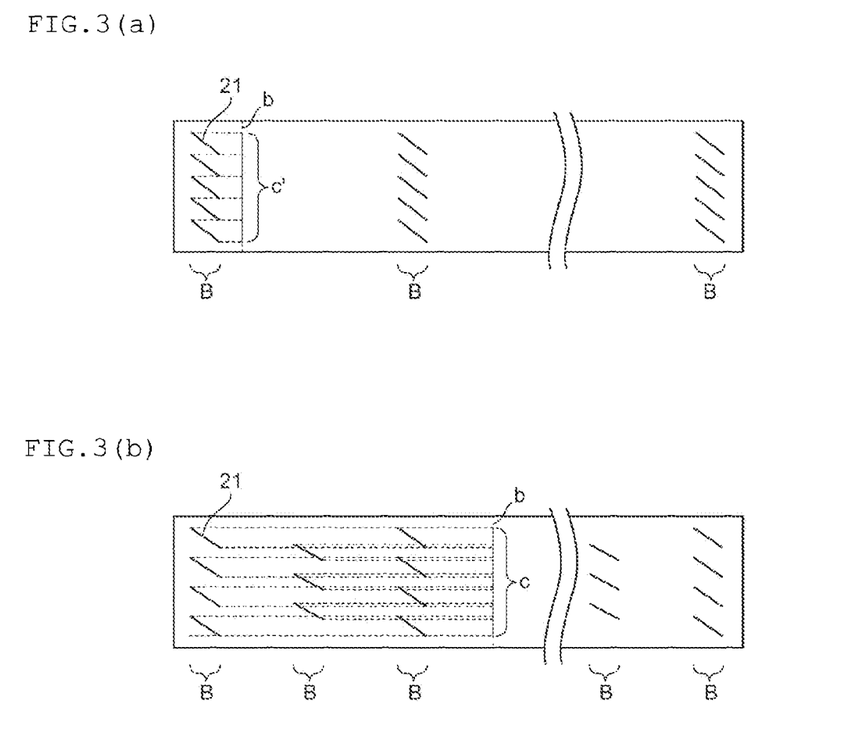
FIG. 3(a) and FIG. 3(b) are each a schematic plan view of a thin glass elongated body according to one embodiment of the present invention.
Figure 4:
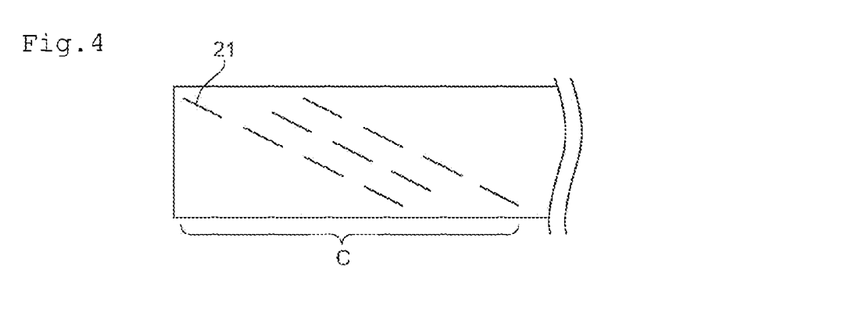
FIG. 4 is a schematic plan view of a thin glass elongated body according to one embodiment of the present invention.
Figure 5:
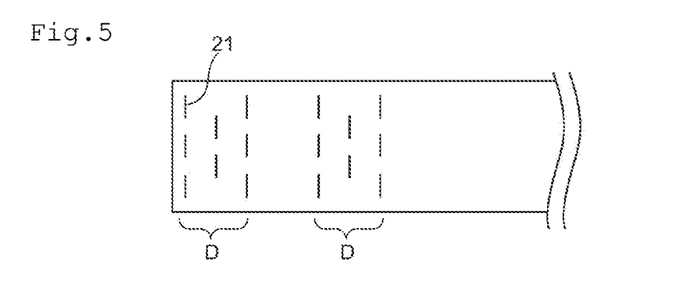
FIG. 5 is a schematic plan view of a thin glass elongated body according to one embodiment of the present invention.

The cutting lines are not limited to the configuration illustrated in FIG. 2 and may be formed at any appropriate positions as long as the effect of the present invention is obtained. For example, as illustrated in FIG. 3(a) and FIG. 3(b), cutting lines aligned in one row in the width direction may form a group B of cutting lines. Further, as illustrated in FIG. 4, the cutting lines may be formed as divided inclined lines without being aligned in one row in the width direction. In FIG. 4, 11 cutting lines form a group C of cutting lines. Further, as illustrated in FIG. 5, the cutting lines may be parallel to the width direction of the resin film. In FIG. 5, 8 cutting lines are aligned in 3 rows to form a group D of cutting lines. In the case where the cutting lines are parallel to the width direction of the resin film, the length of each cutting line is preferably less than 30%, more preferably 20% or less, still more preferably from 3% to 15%, particularly preferably from 3% to 10% with respect to the width of the resin film. In the case where the length of each cutting line is 30% or more with respect to the width of the resin film, the stiffness of the resin film decreases, and there are risks in that the resin film may not serve as the protective film and the troubles during the conveyance in the roll-to-roll process may occur. It should be noted that, in FIG. 3 to FIG. 5, the cutting lines formed regularly are illustrated, but the cutting lines may be formed irregularly in terms of the length, direction, and/or position.

Figure 6:
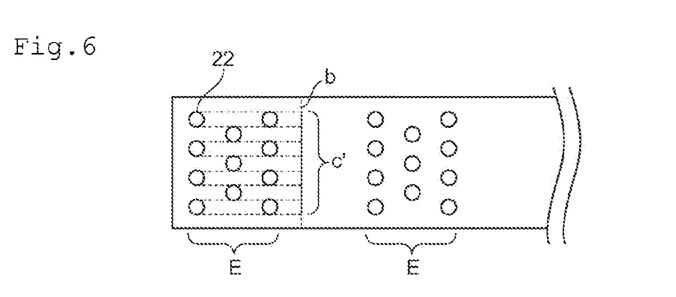
FIG. 6 is a schematic plan view of a thin glass elongated body according to one embodiment of the present invention.

Further, as illustrated in FIG. 6, the resin film may include holes 22 each penetrating through the resin film in place of (or in addition to) the cutting lines. In FIG. 6, 11 holes are aligned in 3 rows to form a group E of holes. As the size and shape of each hole, any appropriate size and shape may be adopted as long as the effect of the present invention is obtained. The holes may be round holes or rectangular holes. The diameter of each hole is, for example, from 1 cm to 5 cm.

It is preferred that, when the plurality of cutting lines or holes are projected onto the width direction of the resin film, a set of projection lines projected onto one imaginary line b parallel to the width direction of the resin film form one continuous line c, c' or one discontinuous line having a disconnected portion of 5 mm or less (FIG. 2, FIG. 3(a), FIG. 3(b), and FIG. 6; the same also applies to FIG. 4 and FIG. 5 although the projection lines and the imaginary line are not illustrated). It is more preferred that the set of the projection lines on the basis of one group of cutting lines or one group of holes, that is, the set of the projection lines obtained by projecting the cutting lines or holes in each group onto one imaginary line b parallel to the width direction of the resin film form one continuous line c' (FIG. 2, FIG. 3(a), and FIG. 6; the same also applies to FIG. 4 and FIG. 5 although the projection lines and the imaginary line are not illustrated). It should be noted that, in FIG. 2, FIG. 3 (a), FIG. 3 (b), and FIG. 6, the imaginary line b is denoted by a dotted line, and the continuous line c, c' is denoted by a thin solid line, so as to be distinguished from the cutting lines 21.

As described above, in the case where the set of the projection lines of the plurality of cutting lines or holes may form one continuous line, air trapped over an entire region of the thin glass elongated body in the width direction can be released easily by the roll-to-roll process, and thus the thin glass elongated body having a small amount of a few air bubbles can be obtained. Further, in the case where the set of the projection lines on the basis of one group of cutting lines may form one continuous line, the trapped air is released in each group of cutting lines by the roll-to-roll process, and hence the thin glass elongated body having a small amount of air bubbles can be obtained. In addition, the state in which the trapped air (air bubbles) accumulates is less liable to continue during manufacturing, and hence the thin glass elongated body capable of being manufactured with less trouble during processing can be obtained. Also in the case where the set of the projection lines of the cutting lines or holes may form a discontinuous line having a disconnected portion of 5 mm or less, the above-mentioned effect can be obtained. The length of the disconnected portion is preferably 3 mm or less, more preferably 1 mm or less, still more preferably 0 mm (that is, a continuous line).

The length of the continuous line c, c' is preferably 60% or more, more preferably 80% or more, still more preferably 90% or more with respect to the width of the resin film. In such a range, the trapped air is released more reliably. In the case where the set of the projection lines of the cutting lines or holes may form the discontinuous line having a disconnected portion of 5 mm or less, the length of the discontinuous line is preferably 60% or more, more preferably 80% or more, still more preferably 90% or more with respect to the width of the resin film. It is preferred that the cutting lines be formed so that the continuous line and the discontinuous line are formed in a center portion of the resin film in the width direction.

Figure 7:
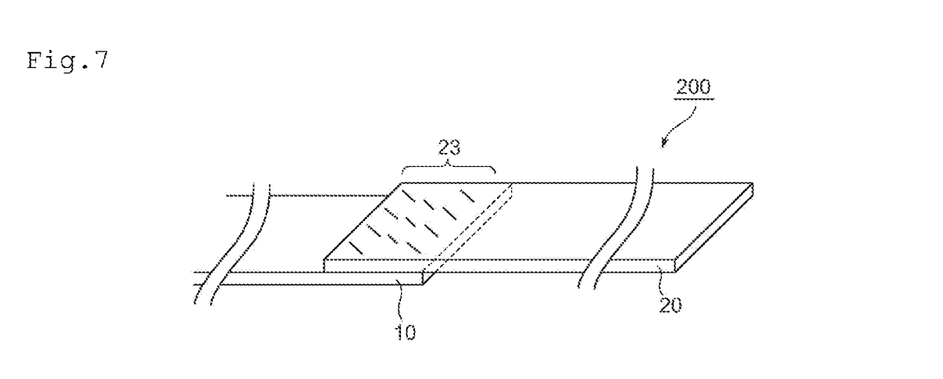
FIG. 7 is a perspective view for schematically illustrating a thin glass elongated body according to another preferred embodiment of the present invention.

FIG. 7 is a perspective view for schematically illustrating a thin glass elongated body according to another preferred embodiment of the present invention. In FIG. 7, the lateral direction of the drawing sheet corresponds to the longitudinal direction of the thin glass elongated body. A thin glass elongated body 200 includes a thin glass 10 and a resin film 20 connected to an end portion in the longitudinal direction of the thin glass 10. In this embodiment, the end portion in the longitudinal direction of the thin glass 10 and an end portion on the thin glass side in the longitudinal direction of the resin film 20 are laminated to form a connecting portion 23. In the connecting portion 23, a plurality of cutting lines and/or holes each penetrating through the resin film 20 are formed. The configuration of the cutting lines and holes is as described above.

The thin glass elongated body 200 illustrated in FIG. 7 includes the resin film 20 in the end portion of the thin glass 10, and the thin glass elongated body 200 can be hung on a device by handling the resin film 20 in the roll-to-roll process. Therefore, the breakage of the thin glass 10 in a preparation stage of the roll-to-roll process can be prevented. It should be noted that although only the end portion on one side of the thin glass 10 is illustrated in FIG. 7, the resin film 20 may be arranged in end portions on both sides instead of being arranged only in the end portion on one side of the thin glass 10 in the longitudinal direction. Further, although a pressure-sensitive adhesive layer is not illustrated in FIG. 7, the pressure-sensitive adhesive layer may be formed on a surface of the resin film 20 corresponding to the connecting portion 23.

Figure 8:
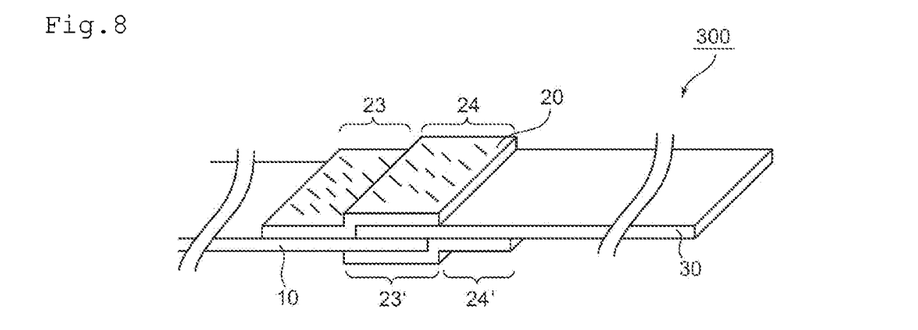
FIG. 8 is a perspective view for schematically illustrating a thin glass elongated body according to still another preferred embodiment of the present invention.

FIG. 8 is a perspective view for schematically illustrating a thin glass elongated body according to still another preferred embodiment of the present invention. In FIG. 8, the lateral direction of the drawing sheet corresponds to the longitudinal direction of the thin glass elongated body. A thin glass elongated body 300 includes a thin glass 10 and another film 30 connected to an end portion in the longitudinal direction of the thin glass 10. The end portion in the longitudinal direction of the thin glass 10 and an end portion on the thin glass side in the longitudinal direction of the other film 30 are laminated to be connected to each other. The resin film 20 is formed on one surface or both surfaces (on both surfaces in the illustrated example) of the thin glass elongated body 300 so as to cover the laminated portion and the vicinity thereof. In the embodiment illustrated in FIG. 8, the resin film 20 protects a connecting portion of the thin glass 10 and the other film 30. In portions 23 and 23' in which the thin glass 10 and the resin film 20 are laminated, the resin film 20 includes a plurality of cutting lines and/or holes each penetrating through the resin film 20. It is preferred that, also in portions 24 and 24' in which the other film 30 and the resin film 20 are laminated, the resin film 20 include the plurality of cutting lines and/or holes each penetrating through the resin film 20. The configuration of the cutting lines and holes is as described above. It should be noted that although only the end portion on one side of the thin glass 10 is illustrated in FIG. 8, the other end portion of the thin glass 10 may also have the same configuration.

Practically, the thin glass elongated body may be provided as a thin glass rolled body into a state in which the thin glass elongated body is taken up into a roll shape. In the thin glass elongated body of the present invention, air is not trapped between the thin glass and the resin film when the thin glass and the resin film are bonded onto each other, or air can be released in the roll-to-roll process even in the case where air is trapped. Therefore, the breakage of the thin glass caused by the trapped air (air bubbles) can be prevented also in the case where the thin glass elongated body is taken up as the thin glass rolled body.

<Thin Glass>

As the thin glass, any appropriate thin glass may be adopted as long as the thin glass has a plate shape. As the thin glass, according to the classification based on a composition, there are given, for example, soda-lime glass, borate glass, aluminosilicate glass, and quartz glass. Further, according to the classification based on an alkaline component, there are given alkali-free glass and low-alkali glass. The alkali-free glass is preferably used. This is because the alkali-free glass is excellent in strength and chemical durability. In the case where the thin glass elongated body includes a plurality of thin glasses, the plurality of thin glasses may be those belonging to the same classification or those belonging to different classifications.

As a method of forming the thin glass, any appropriate method may be adopted. Typically, the thin glass is manufactured by melting a mixture containing main raw materials, such as silica and alumina, an antifoaming agent, such as a salt cake and antimony oxide, and a reducing agent, such as carbon, at temperature of from 1,400° C. to 1,600° C. so as to form the mixture into a thin plate shape, and cooling the resultant. As a method of forming the thin glass into a thin plate, there are given, for example, a slot down-draw method, a fusion method, a float method, and the like. The thin glass formed into a plate shape by those methods may be reduced in thickness or subjected to chemical polishing with a solvent, such as hydrofluoric acid, as necessary, in order to increase the smoothness of a surface and an end portion.

The thickness of the thin glass is preferably from 10 μm to 150 μm, more preferably from 20 μm to 120 μm, still more preferably from 30 μm to 100 μm. In the case where the thickness of the thin glass is more than 150 μm, the thin glass does not have sufficient flexibility, and there is a risk in that the thin glass may be difficult to take up into a roll shape. Further, in the case where the thickness of the thin glass is less than 10 μm, there is a risk in that the handling may be difficult.

The width of the thin glass is preferably 300 mm or more, more preferably 400 mm or more. In general, a wide thin glass is difficult to handle because a significant load is applied to the thin glass when the thin glass is twisted or deflected under the self weight. The present invention exhibits the effect markedly in the processing or treatment of the wide thin glass, which is usually difficult to handle. The upper limit of the width of the thin glass is preferably 2,000 mm or less, more preferably 1,500 mm or less, still more preferably 1,200 mm or less.

The length of the thin glass may be set to any appropriate length depending on a desired treatment or processing amount. For example, the thin glass having a length of from 30 m to 1,000 m may be used.

<Resin Film>

The resin film preferably includes the base material layer and the pressure-sensitive adhesive layer. The pressure-sensitive adhesive layer may be formed on the entire surface of the base material layer, or may be formed on part of the surface thereof. As a material for forming the base material layer, any appropriate resin may be selected as long as effect of the present invention is obtained. As such resin for forming the resin film, there are given, for example, polyethylene, polyvinyl chloride, polyethylene terephthalate, polyvinylidene chloride, polypropylene, polyvinyl alcohol, polyester, polycarbonate, polystyrene, polyacrylonitrile, an ethylene vinyl acetate copolymer, an ethylene-vinyl alcohol copolymer, an ethylene-methacrylic acid copolymer, nylon, cellophane, and a silicone resin. Of those, a polyethylene terephthalate-based resin or polyethylene is preferably used.

The base material layer has a thickness of preferably from 2 μm to 300 μm, more preferably from 10 μm to 200 μm.

For example, a rubber-based pressure-sensitive adhesive, an acrylic pressure-sensitive adhesive, a silicone-based pressure-sensitive adhesive, and a urethane-based pressure-sensitive adhesive are given as the material for forming the pressure-sensitive adhesive layer.

The thickness of the pressure-sensitive adhesive layer is preferably from 1 μm to 200 μm, more preferably from 4 μm to 100 μm, still more preferably from 5 μm to 50 μm.

The resin film has a pressure-sensitive adhesive strength (substantially the pressure-sensitive adhesive strength of the pressure-sensitive adhesive layer) of preferably from 0.002 N/25 mm to 2.0 N/25 mm, more preferably from 0.002 N/25 mm to 1.0 N/25 mm, still more preferably from 0.005 N/25 mm to 0.9 N/25 mm, with respect to the thin glass. When the resin film has a pressure-sensitive adhesive strength falling within the above-mentioned range, the resin film can easily be peeled off from the thin glass in the case where the resin film needs to be peeled off from the thin glass. It should be noted that the pressure-sensitive adhesive strength may be measured as follows: the resin film is bonded onto the thin glass so that the pressure-sensitive adhesive layer side faces the thin glass; and after the lapse of 30 minutes, the pressure-sensitive adhesive strength is measured with a pressure-sensitive adhesive strength measurement device (for example, an instron-type tensile tester, manufactured by Shimadzu Corporation, autograph) under the conditions of a temperature of 23° C., a humidity of 50% RH, a peeling direction of 180°, and a peel rate of 300 mm/min.

The thickness of the resin film is preferably from 3 μm to 320 μm, more preferably from 5 μm to 250 μm, still more preferably from 20 μm to 50 μm. In the case where the thickness of the resin film is less than 3 μm, there is a risk in that it may become difficult to laminate the resin film and the thin glass. In the case where the thickness of the resin film is more than 320 μm, the thin glass elongated body does not have sufficient flexibility, and there is a risk in that the thin glass elongated body may not be suitable for the roll-to-roll process.

A product of the Young's modulus and the thickness of the resin film is preferably from 50 GPa·μm to 1,000 GPa·μm, more preferably from 50 GPa·μm to 500 GPa·μm. That is, in the case of using a thick resin film, it is preferred to select a material having a low Young's modulus as compared to the case of using a thin resin film. With this, the thin glass elongated body having a high protective effect on the thin glass can be obtained. The Young's modulus as used herein refers to a value calculated from a maximum tangent gradient in a stress-strain (S-S) curve obtained by stretching a strip sample having a width of 10 mm at 23° C., a chuck distance of 50 mm, and a speed of 300 mm/min.

It is preferred that the product of the Young's modulus and the thickness of the resin film be smaller than a product of the Young's modulus and the thickness of the thin glass. The product (GPa·μm) of the Young's modulus and the thickness of the resin film is preferably 90% or less, more preferably 80% or less, still more preferably 70% or less, particularly preferably 60% or less, most preferably 50% or less, with respect to the product (GPa·μm) of the Young's modulus and the thickness of the thin glass. The resin film described above is preferred because a load caused by bending is less liable to be applied to the resin film than in the case of the thin glass. Further, when the resin film which is bent more easily than the thin glass is used, the thin glass elongated body excellent in flexibility can be obtained.

The width of the resin film is preferably from 90% to 120%, more preferably from 100% to 110%, still more preferably 100% with respect to the width of the thin glass. In such a range, the resin film can effectively protect the thin glass, and the alignment is more easily adjusted at the time of processing or treatment.

<Another Film>

As a material for forming the other film, any appropriate material may be selected as long as the effect of the present invention is obtained. As the material for forming the other film, a material having higher toughness than that of the thin glass is used, and examples thereof include a resin and a metal. Examples of the resin include a polyethylene terephthalate-based resin, a polyimide-based resin, a polyamide-based resin, a polyethylene naphthalate-based resin, a polycarbonate-based resin, and a cycloolefin-based resin. Of those, a polyethylene terephthalate-based resin is preferably used. Examples of the metal include aluminum, stainless steel, copper, iron, and lead. Of those, aluminum or stainless steel is preferably used.

A fracture toughness value of the other film is preferably from 2 MPa·m$^{1/2}$ to 20 MPa·m$^{1/2}$, more preferably from 5 MPa·m$^{1/2}$ to 20 MPa·m$^{1/2}$, particularly preferably from 10 MPa·m$^{1/2}$ to 20 MPa·m$^{1/2}$.

The thickness of the other film is preferably from 5 μm to 500 μm. When the other film is formed of the resin, the thickness of the other film is more preferably from 10 μm to 200 μm, still more preferably from 30 μm to 100 μm. When the other film is formed of the metal, the thickness of the other film is more preferably from 5 μm to 200 μm, still more preferably from 30 μm to 50 μm.

The width of the other film may be set to any appropriate width depending on the width of the thin glass. An absolute value of a difference between the width of the thin glass and the width of the other film is preferably 20 mm or less, more preferably 10 mm or less, most preferably 0 mm.

It is preferred that the length of the other film be equal to or more than the length (length from feed to take-up) of a device in which the thin glass elongated body is set. The length of the other film is, for example, from 5 m to 200 m.

B. Method of Manufacturing Thin Glass Elongated Body

The thin glass elongated body of the present invention may be manufactured by bonding the thin glass and the resin film onto each other by any appropriate method. For example, the thin glass elongated body of the present invention may be manufactured by the roll-to-roll process involving subjecting the thin glass and the resin film to preliminary bonding by laminating the resin film onto the thin glass, and subjecting, after the preliminary bonding, the thin glass and the resin film to final bonding through use of a pressure roll, such as a laminate roll or a nip roll.

As described above, the cutting lines and/or holes are formed in the resin film. The cutting lines or holes may be formed before the preliminary bonding of the thin glass and the resin film or after the preliminary bonding, but it is preferred that the cutting lines or holes be formed before the final bonding. In the present invention, the cutting lines or holes are formed in the resin film before a laminate of the thin glass and the resin film passes through the pressure roll, and hence air trapped between the thin glass and the resin film can be released at an inlet of the roll. Therefore, troubles during the processing such as the breakage of the thin glass can be prevented.

As a method of forming the cutting lines and holes, any appropriate method may be adopted. Examples of the method include a method involving using a blade and a method involving using laser light.

EXAMPLES

The present invention is hereinafter specifically described by way of Example. However, the present invention is not limited to Example.

Example 1

A resin film (PET film, total thickness: 25 μm) including a pressure-sensitive adhesive layer was laminated on the entire surface on one side of a thin glass (thickness: 50 μm) having a length of 20 m and a width of 300 mm to subject the thin glass and the resin film to preliminary bonding. Then, cutting lines were formed in the resin film as illustrated in FIG. 2. The length of each cutting line was set to 40 mm and the inclined angle a thereof was set to 45°. Further, a group A having 11 cutting lines (4 cutting lines/3 cutting lines/4 cutting lines in 3 rows) was formed in a region having a width of 300 mm and a length of 500 mm. The eight groups A were formed at an interval of 2 m. Further, in each of the groups A, a set of projection lines obtained by projecting the cutting lines in each group onto one imaginary line b parallel to the width direction of the resin film formed one continuous line c'. In this case, the length of the continuous line c' was set to 90% with respect to the width of the resin film.

Then, the laminate of the thin glass and the resin film was caused to pass through a nip roll, and hence the thin glass and the resin film were subjected to final bonding to form a thin glass elongated body. The thin glass elongated body was taken up to obtain a thin glass rolled body.

As a result of obtaining the thin glass elongated body (thin glass rolled body) in the above-mentioned manner, the thin glass was not broken during manufacturing, air bubbles were not confirmed in the thin glass elongated body after being taken up, and the thin glass was not broken even after the take-up.

INDUSTRIAL APPLICABILITY

The thin glass elongated body of the present invention can be suitably used as a thin glass material to be subjected to the roll-to-roll process, such as a display substrate, a sensor cover, or an element cover.

| Reference Signs List | |
| --- | --- |
| 10 | thin glass |
| 20 | resin film |
| 21 | cutting line |
| 22 | hole |
| 30 | another film |
| 100, 200, 300 | thin glass elongated body |

The invention claimed is:

1. A thin glass elongated body, comprising:
a thin glass having an elongated shape; and
a resin film bonded onto at least part of the thin glass,
wherein the resin film has, in a portion in which the thin glass and the resin film are laminated, a plurality of cutting lines each penetrating through the resin film, and
wherein when the plurality of cutting lines are projected onto one imaginary line that is perpendicular to a longitudinal direction of the resin film, the plurality of cutting lines define a plurality of projection lines, and at least one end of each projection line corresponding to one of the plurality of cutting lines contacts an end of the project line corresponding to an adjacent one of the plurality of cutting lines, so that the plurality of projection lines form one continuous line, wherein a length of each of the plurality of cutting lines is less than 30% with respect to a width of the resin film, and
wherein at least a portion of the plurality of cutting lines are formed at an angle of 30-60° relative to the longitudinal direction of the resin film.

2. The thin glass elongated body according to claim 1, wherein a length of the continuous line or the discontinuous line is 60% or more with respect to a width of the resin film.

3. The thin glass elongated body according to claim 1, wherein the thin glass has a thickness of from 10 μm to 150 μm.

4. The thin glass elongated body according to claim 1, wherein the thin glass and the resin film are bonded onto each other through intermediation of a pressure-sensitive adhesive layer.

5. A thin glass rolled body, which is formed by taking up the thin glass elongated body of claim 1.

6. A method of manufacturing the thin glass elongated body of claim 1, the method comprising:
subjecting the thin glass and the resin film to preliminary bonding by laminating the resin film onto the thin glass; and
subjecting, after the preliminary bonding, the thin glass and the resin film to final bonding through use of a pressure roll,
the method further comprising, before the final bonding, forming a plurality of cutting lines and/or holes each penetrating through the resin film in the resin film.

7. The thin glass elongated body according to claim 1,
wherein the plurality of cutting lines are formed in groups at intervals of 2 to 30 m in the longitudinal direction of the resin film, and
wherein each group of cutting lines occupies an area of the resin film having a width of from 300 mm to 1,000 mm and a length of from 100 mm to 1,000 mm.

* * * * *